6943X
J. H. Cory,
Horse Power.
Patented Feb. 27, 1832.
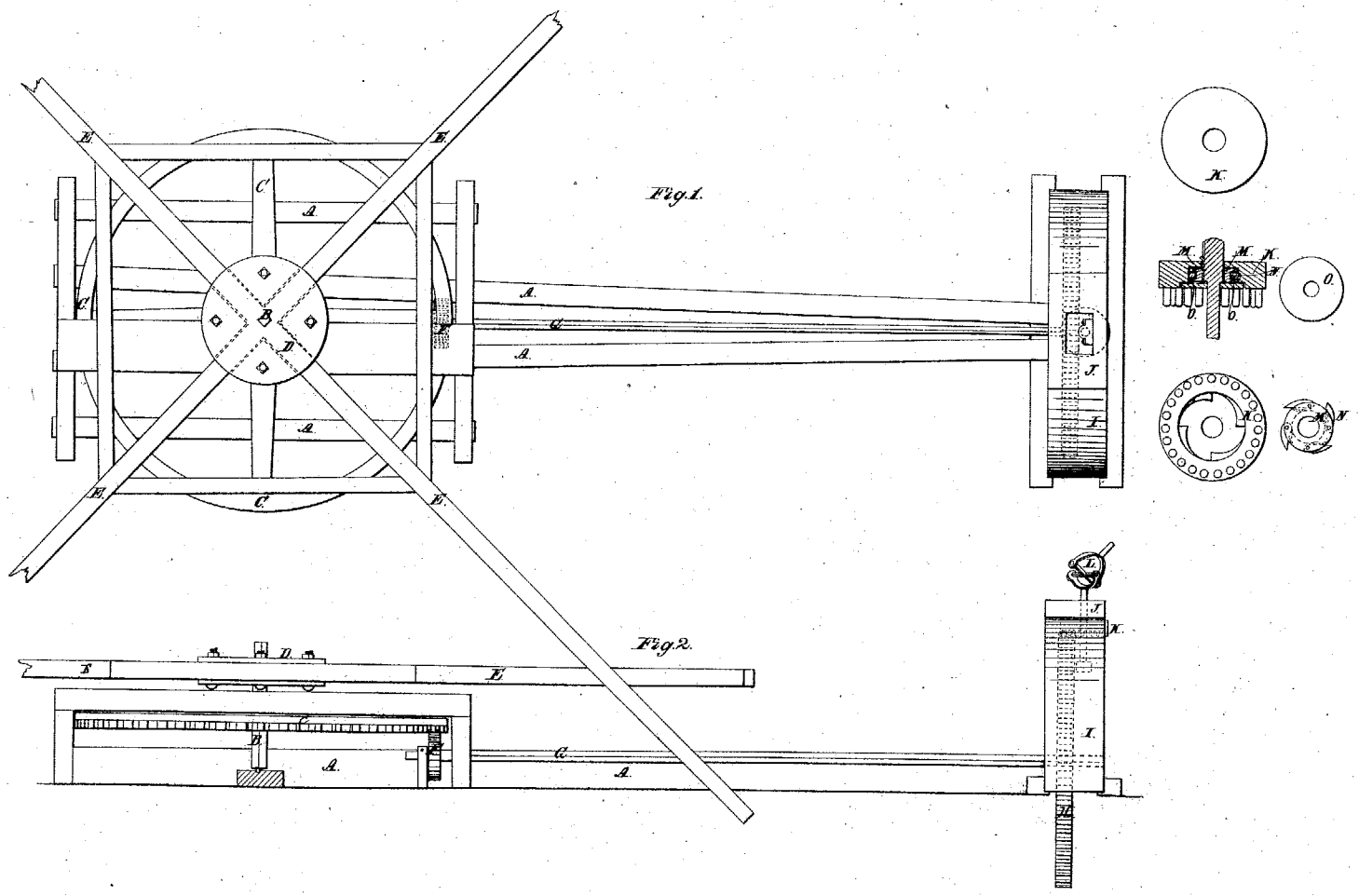
AM. PHOTO-LITHO. CO. N.Y. (OSBORNE'S PROCESS)

~~6891X~~
X6943

Feb 27, 1832

James A Corey Bethel Township Ohio

Letters Patent

The Schedule referred to in these Letters Patent and making part of the same contain-
-ing a description in the words of the said James A Corey himself of his improvement
in portable Horse Power To all to whom these presents shall come Be it known that I James A Corey of Bethel
Township in the County of Clark and State of Ohio have invented a new and useful im-
-provement in portable Horse Power and that the following is a full and exact
description of the Construction and operation of the said Machine as invented or
improved by me. A frame is necessary of about the following dimensions. Two pie-
-ces of scantling called sills 4 inches by 6 and sixteen feet 4 inches long. Two other
sills of the same size and 7 feet 6 inches long.

The two long ones placed in the Centre about one foot apart at the one
end and 3 inches at the other. The two short ones placed at the outside of the wide
end 3 feet nine inches apart from the outside to the outside.

Two pieces 8 inches by 16 are set on edge near the end of the short
pieces and are sunk 1 inch in all four sills and fastened down by bolts. One piece
of timber 4 inches by ten is laid flat on the last described pieces lengthwise with the
sills with the one edge even with the Centre of the space between the long sills. Against
this inner edge [illegible] are placed to receive the neck of the Horse Shaft and immediately
below a piece of wood about 16 inches long 16 broad and 4 thick is tenoned in the
middle sills to receive the step of the Horse Shaft.

Upon the Horse Shaft between the step and the neck the Horse wheel
is placed which is made of cast metal 6 feet in diameter the rim 8 inches wide with
cogs on the under side. Upon the top of the Horse Shaft is placed a cast flange 2 feet
in diameter which is formed in the following manner.

A plate of 3/4 of an inch thick of the diameter above mentioned with
two pieces rising 2 inches above the plate and of the thickness of 3/4 of an inch cross this
plate parallel with each other leaving 4 inches of the Centre of the plate between them
Two other pieces of the same description cross at right angles with these leaving the

[illegible]

same space. The edge of the plate of the same thickness rises to the same height on each segment of the Circle. So that when a similar plate with the other side up is placed opposite to this one and fastened with four bolts one in each segment appears to form one solid circular wheel of [illegible] inches in thickness 2 feet in diameter with 4 mortices of 4 inches square at equal distances from each other and extending from the edge towards the centre of the wheel to receive the levers to which the horse is attached.

The length of the levers are about 11 feet 6 inches with a brace from one to another near the middle. The Horse wheel Shaft before mentioned will be about 2 feet 3 inches long rounded at the lower end to the diameter of two inches to fit the step in which it stands, 4 inches square up to the neck which is rounded to the diameter of 4 inches and 4 inches long; 4 inches square above the neck and tapering to [illegible] inches at the top which fits to a hole of this size in the centre of the flange. A Shaft of wrought iron 2 inches in diameter 10 feet 6 inches in length has on the one end of it a pinion of about [illegible] inches in diameter with cogs suited to work in the cogs of the Horse wheel both of which wheels are level. On the other end of this Shaft is a second Motion wheel 4 feet in diameter.

This Shaft is placed between the two long sills and the 4 feet wheel runs in a frame mortised in the end of the sills. A curved piece of timber 10 inches broad is fastened near each end of this frame leaving sufficient space between them for the four feet wheel to turn; and extending up to a proper height to receive a cap of [illegible] inches thick 10 wide and tenoned on them; through the centre of this cap a mortice is made to receive the ratchet pinion of about 9 ~~inches in diameter~~. The face of the cogs of this wheel and the one in which it works are [illegible] inches in length.

This wheel (the ratchet wheel) exhibits a plane surface on the one side with the exception of a hole in the centre of about [illegible] inch in diameter, on the other side the diameter of the opening is about [illegible] inches. At about half of an inch from the surface the metal is made to commence at nothing and project [illegible] an inch inward or toward the centre from the Circle before described forming four stops or catches at equal intervals from each other and extending [illegible] inch leaving the metal on the other side [illegible] an inch thick. A small circular plate of about [illegible] an inch thick with a hole of [illegible] inch in diameter in the centre is made to fill the vacancy from the outside to those catches. A piece of metal is made 4 inches in diameter and [illegible] inch thick with a hole in its centre [illegible] in diameter and a proper

~~6871X~~ X6943 round the Centre of the circumference about ½ an inch in width and ½ in depth
4 holes are drilled through the edges of the groove
at equal intervals. Four Catches of wrought iron ¼ an inch square 3½ inches long
with a hole drilled through the one end through which and the holes in the edges of the
groove rivets are put; under each of these Catches is placed a small steel spring which
tends to throw the one end out about ¼ an inch beyond the edge of the groove.
This is then placed in the Cavity of the wheel last above
mentioned in such position that the ends of the last mentioned Catches bear against
the ends of the first mentioned catches. The wheel thus constructed is placed on
the Centre of the rounded part of the Shaft of about 6 inches long and 1½ in diameter
and is prevented from turning on that Shaft by a small groove made in the side
of the Shaft and one in the inner part of the inner wheel which is filled by a wedge.
The advantage of a wheel of this construction is that
if the Horses were to stop while the machine is in rapid motion, the inner part of
the wheel would run around the machinery until its force is spent thereby
guarding the works from the injury which might be sustained by a sudden check.
By means of a universal joint attached to the
last mentioned Shaft. This machinery may be conveniently applied to Threshing
machines, Carding Machines. Grinding, Brewery, turning Lathes &c. The foregoing
improvement may be varied in size and proportions to suit the labours for which
it is intended to be applied.

Witnesses
Saml Dale
Henry H. [illegible]

James H. Corey.

Exd.
[illegible]

[illegible]

(Patented 27 February 1832)